(12) United States Patent
Scott et al.

(10) Patent No.: US 11,349,746 B2
(45) Date of Patent: May 31, 2022

(54) SPECIFYING LINK LAYER INFORMATION IN A URL

(71) Applicant: Microsoft Technology Licensing, LLC, Redmond, WA (US)

(72) Inventors: James W. Scott, Cambridge (GB); Nicolas Villar, Cambridge (GB); Stephen E. Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/777,771

(22) Filed: Jan. 30, 2020

(65) Prior Publication Data

US 2020/0169495 A1 May 28, 2020

Related U.S. Application Data

(63) Continuation of application No. 13/765,984, filed on Feb. 13, 2013, now Pat. No. 10,574,560.

(51) Int. Cl.

| | |
|---|---|
| *G06F 15/16* | (2006.01) |
| *H04L 45/00* | (2022.01) |
| *H04L 101/30* | (2022.01) |
| *H04W 12/50* | (2021.01) |
| *H04W 84/12* | (2009.01) |
| *H04L 69/321* | (2022.01) |
| *H04W 12/77* | (2021.01) |

(52) U.S. Cl.
CPC ............ *H04L 45/00* (2013.01); *H04L 61/303* (2013.01); *H04W 12/50* (2021.01); *H04L 69/321* (2013.01); *H04W 12/77* (2021.01); *H04W 84/12* (2013.01)

(58) Field of Classification Search
None
See application file for complete search history.

(56) References Cited

U.S. PATENT DOCUMENTS

| 8,280,197 | B1 * | 10/2012 | Foote ....................... G06F 3/14 382/305 |
|---|---|---|---|
| 9,021,130 | B1 * | 4/2015 | Sahay ..................... H04L 49/60 709/239 |
| 9,454,285 | B1 * | 9/2016 | Cai .......................... H04L 67/00 |
| 2005/0038876 | A1 * | 2/2005 | Chaudhuri .............. H04L 67/24 709/219 |
| 2005/0246531 | A1 * | 11/2005 | Fabre .................... H04W 12/06 713/168 |
| 2005/0262496 | A1 * | 11/2005 | Seki ........................ G06F 21/10 717/170 |

(Continued)

*Primary Examiner* — Brian Whipple
*Assistant Examiner* — Gregory P Tolchinsky

(57) ABSTRACT

A system of specifying link layer information in a URL is described. In an embodiment, a URL is generated which includes both a link layer network type and information which is used by a resolving device to identify a particular link layer network of the specified type. In various embodiments, the URL includes a link layer network type and a corresponding link layer network name or pairs of link layer network types and corresponding link layer network names. Where the URL comprises more than one link layer network name, the resolving device may determine at runtime which of the named link layer networks to connect to and this decision may be based on criteria or preference information included within the URL.

20 Claims, 5 Drawing Sheets

(56) References Cited

U.S. PATENT DOCUMENTS

| | | | |
|---|---|---|---|
| 2007/0223432 A1* | 9/2007 | Badarinath | H04W 48/18 370/338 |
| 2007/0299976 A1* | 12/2007 | Zafar | H04L 67/1068 709/229 |
| 2008/0151842 A1* | 6/2008 | Tysowski | H04W 4/029 370/338 |
| 2008/0201489 A1* | 8/2008 | Morinaga | H04W 88/06 709/246 |
| 2009/0125997 A1* | 5/2009 | Cook | G06F 21/34 726/6 |
| 2009/0186700 A1* | 7/2009 | Konkle | A63F 13/27 463/42 |
| 2009/0319530 A1* | 12/2009 | Hoertnagl | G06F 16/9566 |
| 2010/0136953 A1* | 6/2010 | Twell | H04W 4/00 455/414.1 |
| 2010/0161765 A1* | 6/2010 | Yang | H04L 61/303 709/219 |
| 2011/0040870 A1* | 2/2011 | Wynn | H04W 4/029 709/224 |
| 2011/0041003 A1* | 2/2011 | Pattar | H04L 41/0654 714/4.3 |
| 2011/0096850 A1* | 4/2011 | Lee | H04L 12/413 375/259 |
| 2013/0174271 A1* | 7/2013 | Handal | H04N 21/4753 726/27 |
| 2013/0225128 A1* | 8/2013 | Gomar | H04W 12/06 455/411 |
| 2013/0332996 A1* | 12/2013 | Fiala | G06F 21/53 726/4 |
| 2014/0057629 A1* | 2/2014 | Liu | H04W 48/16 455/434 |
| 2014/0068719 A1* | 3/2014 | Kiukkonen | H04W 12/50 726/4 |
| 2014/0073289 A1* | 3/2014 | Velasco | H04W 4/02 455/411 |
| 2014/0149603 A1* | 5/2014 | Park | H04L 67/02 709/238 |
| 2015/0038118 A1* | 2/2015 | Berteau | H04L 63/0861 455/411 |
| 2015/0215832 A1* | 7/2015 | Fitzpatrick | H04W 36/04 455/426.1 |

\* cited by examiner

SPECIFYING LINK LAYER INFORMATION IN A URL

CROSS-REFERENCE TO RELATED APPLICATION

This application is a continuation application of and claims priority to U.S. patent application Ser. No. 13/765,984, entitled "SPECIFYING LINK LAYER INFORMATION IN A URL," filed on Feb. 13, 2013, the disclosure of which is incorporated herein by reference in its entirety.

BACKGROUND

Uniform resource locators (URLs) are a standard way of specifying how to access a resource, such as a document or web page, on a particular server. A URL typically specifies the protocol type (such as Hypertext Transfer Protocol, HTTP) and the server name (which may be translated into an IP address using the Domain Name Server, DNS). A URL may also specify a port number and path and parameters for the resource under that server.

The embodiments described below are not limited to implementations which solve any or all of the disadvantages of known URLs.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A system of specifying link layer information in a URL is described. In an embodiment, a URL is generated which includes both a link layer network type and information which is used by a resolving device to identify a particular link layer network of the specified type. In various embodiments, the URL includes a link layer network type and a corresponding link layer network name or pairs of link layer network types and corresponding link layer network names. Where the URL comprises more than one link layer network name, the resolving device may determine at runtime which of the named link layer networks to connect to and this decision may be based on criteria or preference information included within the URL.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Existing URLs specify how to go to a particular resource on a particular server but do not currently include any information about which link layer network (e.g. which WiFi™ network) to use to access that URL or how to connect to that link layer network (e.g. any credentials required). In some examples, however, choice of link layer network may be the difference between being able to access a resource or not, for example, where a given resource is only available on a specific sub-network (e.g. behind a NAT service and/or firewall or if using a device that incorporates a WiFi™ AP as a way of communicating with it).

The term 'link layer' is used herein to refer to a lower layer in the Internet Protocol Suite (which may also be referred to as TCP/IP) which is below the Network layer (which may be referred to as the 'Internet' or 'Internetwork' layer). In some examples, the link layer may encompass the physical layer.

Figure 1:
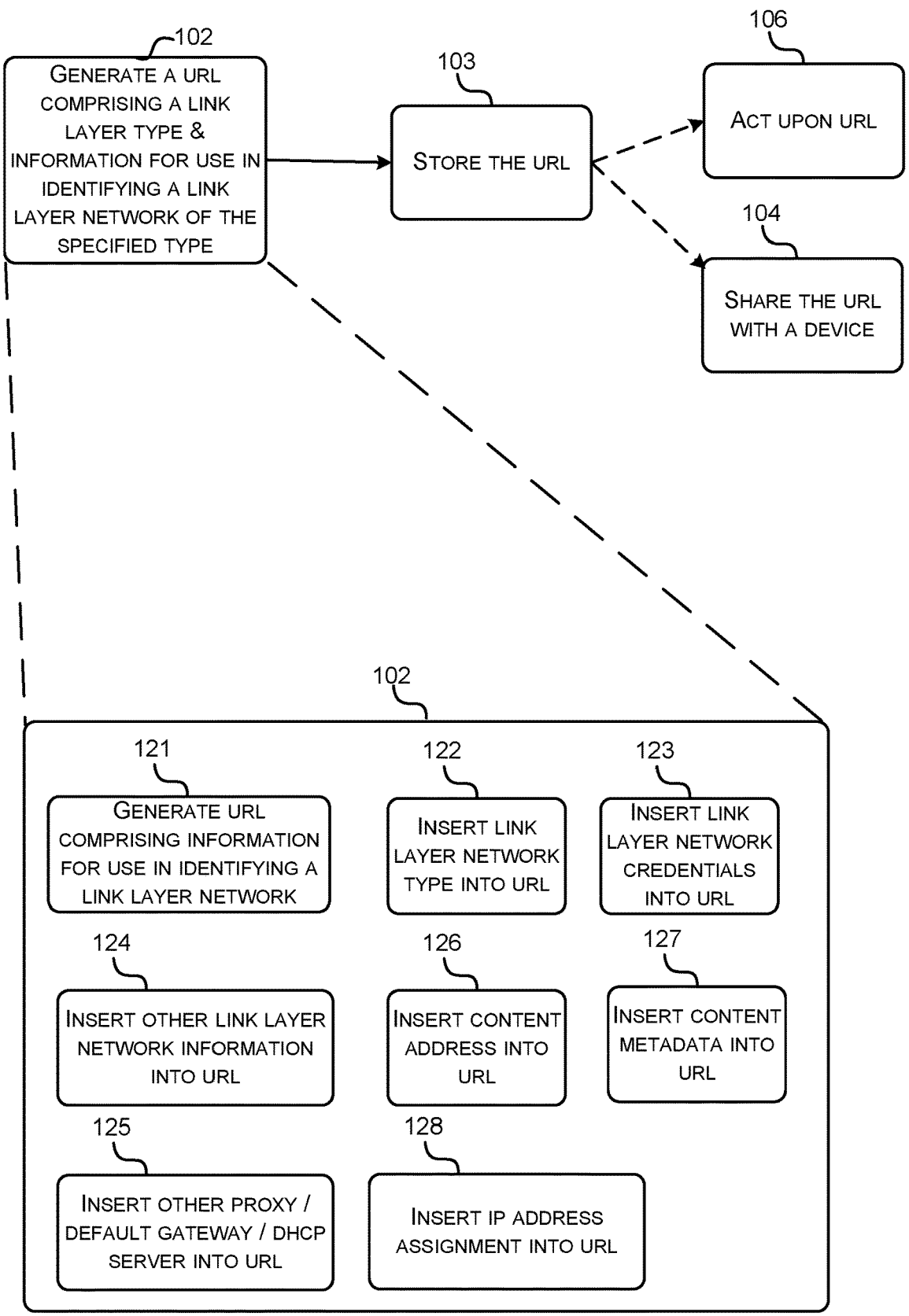
FIG. 1 is a flow diagram of an example method which comprises generating a URL.

FIG. 1 is a flow diagram of an example method which comprises generating a URL (block 102) and then storing the URL (block 103). The storing (in block 103) may only be temporary and the URL may then be shared with a device (block 104). Alternatively, the stored URL (from block 103) may be acted upon by the device which generated it (block 106). The URL which is generated (in block 102) comprises a link layer type (e.g. WiFi™, Bluetooth®, cellular, mobile data such as 3G or 4G, wired Ethernet, etc) and information which can be used by a resolving device to identify a particular link layer network of the specified type. The type information may be specified explicitly or in some examples may be included implicitly such that it can be determined by the device resolving the URL based on the information included within the URL. As described above, the link layer may encompass the physical layer and in which case, the link layer information which is included within the URL may comprise physical layer information (e.g. information which indicates that an AP only supports a particular wireless standard, such as IEEE 802.11n, which allows a resolving device to avoid even trying to connect to the AP if the device does not support that protocol).

The sharing of the generated URL (in block 104) may be done in any way and various examples are described below. The device with which the URL is shared (in block 104) may be a device which resolves the URL (a resolving device) or another device, such as a device which shares the URL with further devices (e.g. a device which acts as a relay between the generating device and a resolving device).

Where the URL is not shared, the operation of acting upon the URL (in block 106) may, for example, comprise configuring the networking software/hardware of a device in order that the communications to the internet endpoint (e.g. IP address and port, or DNS name) specified by the URL are handled in the way specified by the link layer information in the URL. The reconfiguration may comprise modifying the IP routing table of the device, setting up a specially configured TCP/IP socket (which uses a specific network interface for its traffic, e.g. 3G or WiFi™) or associating the device with a different WiFi™ network prior to doing any IP-or-higher-layer communications (e.g. prior to DNS and/or to opening the HTTP connection).

The URL which is generated (in block 102) may be shared (in block 104) in any way. Examples include, but are not limited to:
- email, instant messaging (IM) systems, social networks, Bluetooth™, near field communication (NFC), infra-red (IR),
- displaying it on a screen of the generating device (e.g. in the form of a visual code, such as a QR code, 2D or 3D barcode) for capture by a nearby device (e.g. using a camera on that device),
- displaying it anywhere else, including on a device which is remote from the generating device,
- outputting the URL, or a visual code encoding the URL, to a printer (e.g. to print a label which may be affixed to an appliance or AP)

Some of these sharing mechanisms require proximity between devices (e.g. NFC or displaying a visual code) or some relationship between users (e.g. email, IM or social networks), which may be a trust relationship. Some of these sharing mechanisms may have some inherent security (e.g. email) and others may provide security through the requirement for proximity (e.g. it is very difficult to snoop and capture on a visual code displayed by a smartphone without the user of that smartphone being aware because of the requirement to be in close proximity to the smartphone) or a trust relationship.

The information which can be used by a resolving device to identify a particular link layer network of the specified type may comprise:
- a link layer network name (where 'name' includes any type of identifier);
- a plurality of link layer network names; and/or
- criteria which can be used by the resolving device to select a particular link layer network from one or more available link layer networks.

These are each described in more detail in the following paragraphs.

Where the URL which is generated (in block 102) includes a link layer network name, this may, for example, be a WiFi™ SSID (Service Set Identifier), BSSID (Basic SSID, which identifies a particular AP unlike than the SSID which is he same for all APs in a WiFi™ network), VLAN (Virtual Local Area Network) name, Bluetooth® device name, cellular access point name (APN) or cellular network operator name.

In various examples, the URL may comprise more than one link layer network name (where all the link layer networks may be of the same type which is also specified within the URL). In examples where more than one link layer network name is included within the URL, the resolving device may select (e.g. based on signal strength, other criteria or at random) one of the link layer networks that are specified in the URL. Where only a subset of those link layer networks specified in the URL are currently available to the resolving device (i.e. the available subset does not comprise all the link layer networks specified in the URL), the resolving device may select one of the available link layer networks. The availability in this case may relate to whether the link layer network is visible to the resolving device (e.g. whether it is in range, for wireless link layer networks) and/or whether the resolving device is able to connect to the link layer network (e.g. whether it has the correct permissions or knows the required credentials). In one example, the URL may comprise a link layer network name for a secure network and a link layer network name for an unsecured network and the resolving device may connect to the secure network if it has the appropriate credentials (e.g. network key) and otherwise connect to the unsecured network.

In some examples where more than one link layer network name is included within the URL, the URL may further comprise a priority order for the link layer networks identified. For example, the URL may comprise three link layer network names, A, B, C, listed in that order and this order (within the URL) may define the priority order. In such an example, the resolving device may attempt to connect to link layer network A first, but if this is not possible, the device may attempt to connect to link layer network B instead. If the resolving device is not able to connect to either link layer network A or link layer network B, it may then attempt to connect to link layer network C. Alternatively, the priority order may be included within the URL in any other way. In other examples, preference information may be provided instead of a priority order (e.g. indicating that one link layer network is preferred over the others identified within the URL).

In various examples where the URL (generated in block 102) comprises more than one link layer network name, the URL may further comprise other rules or criteria (in addition to, or instead of preference/priority criteria) which are used by the resolving device to select one of the link layer networks listed in the URL. Examples of such criteria include, but are not limited to:
- time of day (e.g. connect to link layer network A between 9 am and 5 pm and connect to link layer network B at all other times);
- location of the resolving device, where the resolving device is location-aware (e.g. connect to link layer network A when at work and connect to link layer network B when at home);
- quality of service (QoS) such as a minimum bandwidth or signal strength (e.g. connect to link layer network A if bandwidth exceeds x MB/s, otherwise connect to link layer network B);
- characteristics of the content being accessed (e.g. connect to link layer network A if the file size is less than x MB/s, otherwise connect to link layer network B) and in some examples, the content size may be determined by the resolving device by downloading a header in advance of the rest of the content (e.g. and potentially changing link layer networks after downloading the header);
- characteristics of content to be uploaded (to the URL); and
- credentials which available to the resolving device or user, (e.g. connect to a secure APN or WLAN if the credentials are available or connect to an open APN or WLAN if they are not available).

In various examples, any one or more of these criteria may be included within metadata in the URL to enable the resolving device to select a link layer network from those listed in the URL. In all these examples, the selection of a link layer network from those listed in the URL by the resolving device is performed automatically by the resolving device (based on the criteria). In some examples, the selection may be performed without user input and in other examples, a user may provide a confirmation of the selection made automatically by the resolving device (e.g. "Press enter to connect to wireless network X to get to resource Y").

In various examples, the URL which is generated (in block 102) may comprise criteria which may be used by the resolving device to select a particular link layer network from the available link layer networks without the URL comprising any explicit link layer network name. In some examples, the URL may specify the link layer network type (such that the selection is made from the available link layer networks of the specified type) and in other examples, this may not be explicitly specified within the URL and the resolving device may select a particular link layer network from any available link layer network of any type. Examples of such criteria include, but are not limited to:

QoS, such as a minimum bandwidth or signal strength;
whether the link layer network is metered or un-metered (e.g. whether there is a cost to the connection, such as in $/MB, or a download limit, or not);
the cost of use of the link layer network (e.g. metered but at no more than $x/MB); and
characteristics of the content being accessed (e.g. file size).

In these examples, although the URL does not include a particular link layer network name, the information which is contained within the URL enables the resolving device to select a link layer network of the specified type from the available link layer networks. These criteria may also be described as being used by the resolving device to filter the available link layer networks in order to identify the particular link layer network to connect to.

In some examples, the URL which is generated (in block 102) may comprise pairs of link layer network type (linktype) and link layer network name (linkid), for example:

scheme://{linktype:linkid, linktype:linkid, linktype:linkid, ...} username:password@domain:port/path?query_string#fragment_id where the link layer network information is added between the curly braces { } and the portion of the URL following these curly braces may be based on an existing (or new) schema. It will be appreciated that this is just one example and there are many alternative schemes which may be used to include the link layer network information described herein. In such an example, different pairs may relate to link layer networks of different types, for example:
{wifi:AP1, cellular:Vodafone}
In the above example, the first pair relates to a WiFi™ link layer network and a particular AP (AP1) and the second pair relates to a cellular link layer network and the link layer network name is 'Vodafone'.

In any of the examples described herein where criteria are included within the URL, these criteria may be used at runtime by the resolving device to make a decision about which link layer network to connect to. This provides flexibility within the URL and this may be particularly useful for mobile applications, where the available link layer networks may change as the resolving device changes location.

In an example, which may be described with reference to the schematic diagram in FIG. 2, a generating (or originating) device 202 generates a URL which comprises link layer network type, name pairs (as described above) and identifies a piece of content (block 22). In this example, the piece of content may be a video which is stored in two locations: on a home server 204 and on a remote server 206 (e.g. which is accessible via a media streaming service) and the link layer network type, name pairs may correspond to a WiFi™ home AP 208 and a cellular network 210. These two pairs may be listed in an order of priority (e.g. WiFi™ home AP first followed by the cellular network, {wifi:AP1, cellular:Vodafone}) or a priority or preference may be specified in another way.

The URL which is generated (in block 22), is shared with another device 212 (block 24) which in this example may be a smartphone, tablet or other portable device. When a user wishes to view the content on the second device 212 (the resolving device), the device 212 resolves the URL and in particular, identifies the link layer information in the URL (block 26), which in this case comprises two link layer network type, name pairs. The selection of a particular link layer network (in block 28) is made at runtime and in this example is based on priority or preference information contained (explicitly or implicitly) within the URL and the current availability of the identified link layer networks. In this example, if the home AP 208 is available, that will be selected (in block 28) and if not, the cellular network 210 will be selected. If neither is available, the resolving device will be unable to select a link layer network type and the process will stop. As shown in FIG. 2, the selection process (in block 28) may rely on the resolving device determining which link layer networks are available (block 27). Where a link layer network is selected (in block 28), the resolving device 212 then connects to that network (in block 29) and accesses the content.

Figure 2:
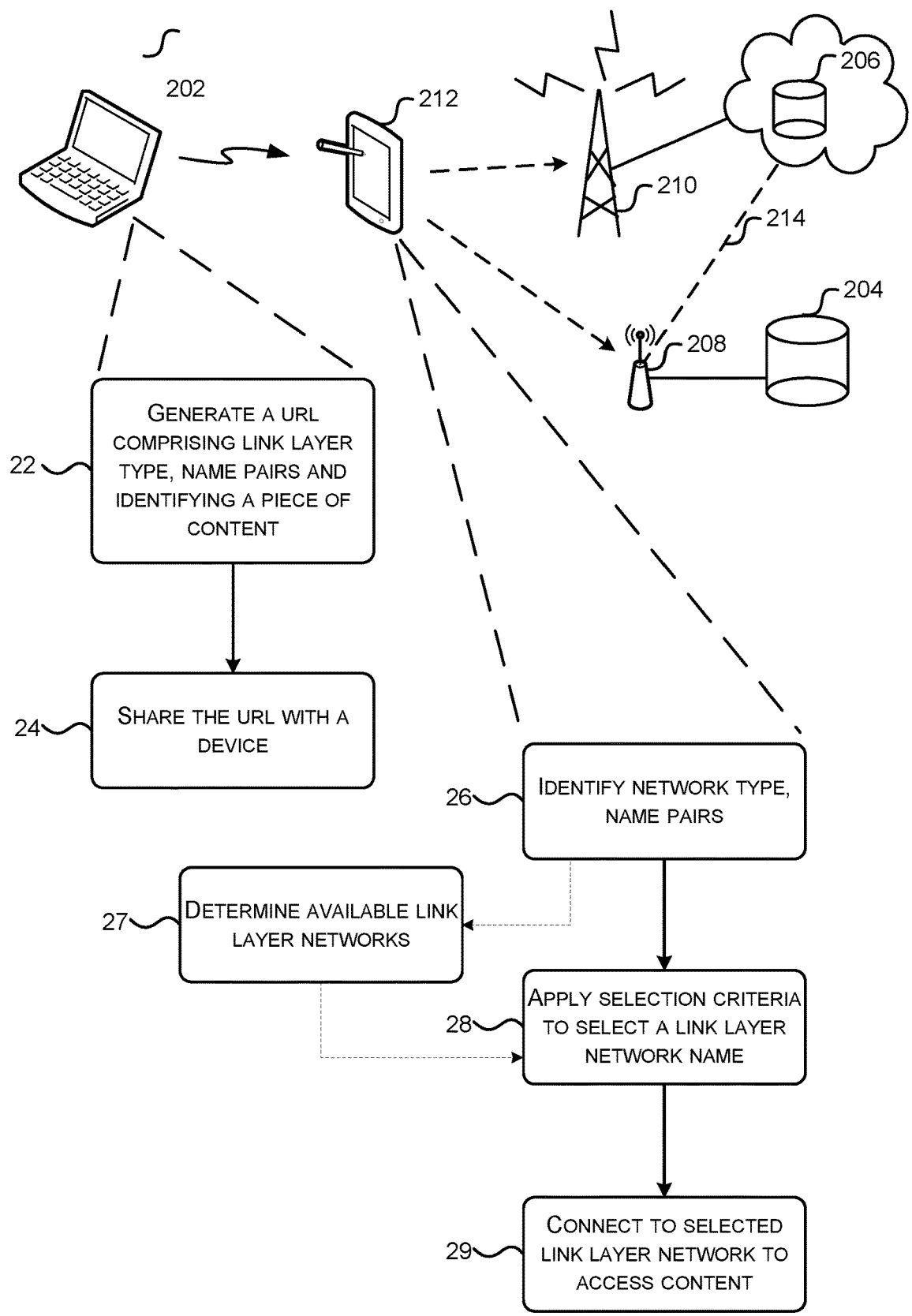
FIG. 2 shows a schematic diagram of both a generating and resolving device and example methods of operation of both devices.

It can be seen from the example in FIG. 2 that by specifying more than one link layer network name in the URL, a piece of content (or other resource) can be accessed from different locations dependent upon conditions at runtime (e.g. available link layer networks, as determined in block 27). Alternatively, the piece of content may be accessed from the same location but via different link layer networks (e.g. the piece of content in FIG. 2 may be accessed from the remote server 206 irrespective of whether the resolving device 212 connects to the cellular network 210 or the home AP 208, as indicated by dotted line 214).

In some examples, for example where the URL comprises criteria, these criteria may be written in a script (e.g. in XML) which is included within the URL. Use of a script (e.g. in XML), rather than a more structured scheme for specifying these criteria, provides greater flexibility in relation to the type of criteria which may be specified. For example, the script may comprise one or more conditional statements of the form:
if A, then $\{T_1:ID_1\}$, if B then $\{T_2:ID_2\}$ . . .
or, in XML:

```
<if>
<condition>A</condition>
<then>B</then>
<else>C</else>
</if>
```

In other examples, the URL may comprise JSON or other structured formats to encode criteria, scripts, lower layer network names and/or types etc.

The URL which is generated (in block 102) may comprise additional information as well as the link layer type (inserted into URL in block 122) and information which can be used by a resolving device to identify a particular link layer network of the specified type (inserted into URL in block 121). The additional information may, for example, comprise one or more of:

credentials for a link layer network (block 123),
    other information relating to the link layer network (block 124), such as which SIM card to use for a multi-SIM cellular device,
    a proxy, default gateway or DHCP server to use (block 125),
    an explicit address of a piece of content on the network (block 126),
    metadata relating to the content (block 127), for example when it was last updated (e.g. to aid in using cached content where possible and reduce network utilization), and
    the IP address assignment (block 128) for dynamically generated URLs, such that the DHCP assignment is done as part of passing the URL which avoids a number of network round-trips (e.g. for DNS look-up, DHCP, etc).

These examples are shown in the expansion of block 102 in FIG. 1 and described in more detail below.

In various examples, the URL may further comprise credentials (linkcreds) for link layer networks identified within the URL, for example:

```
scheme://{linktype:linkid:linkcreds}
username:password@domain:port/path?query_string#fragment_id
or
scheme://{linktype:linkid:linkcreds,
linktype:linkid:linkcreds, linktype:linkid:linkcreds, ...}
username:password@domain:port/path?query_string#fragment_id
```

These credentials may, for example, be the key for a particular WiFi™ AP, the PIN for use with Bluetooth®, a WPA Pre-Shared Key, a one-time-session-only credential for time-limited access, etc.

The credentials which may be included within the URL (in block 123) may be static, such that the URL can be bookmarked within a browser or other application. This means that a resolving device can repeatably access a resource defined by the URL using the link layer network information included within that URL.

In other examples, the credentials may change, such that each time the URL is shared (in block 104), or each time the URL is shared with a different device, a different credential is included within the URL. In such an example, the credential may provide a one-time key for the link layer network identified in the URL.

In various examples, the credential which is included within the URL (in block 123) may be specific to a particular piece of content (e.g. where the URL further comprises the content address), such that by sharing a URL which points to a piece of content on a server, the resolving device only has access to the piece of content and not any other content stored on that server. This may, for example, be useful when a user uses such a URL to share content stored on a computing device with another user. In such an example, a first user may trigger the generation of a URL (in block 102) which points to the content and where the URL comprises link layer information which identifies a wireless AP running on the first user's computing device (e.g. laptop, tablet or smartphone) and credentials for connecting to that AP. The first user may then send the URL to a second user (e.g. via email) who can the use a browser (or other application) to access the content. If the credentials relate both to the AP and the content, the second user can only access the particular piece of content and the security of the data stored on the first user's computing device is improved.

The URL may further comprise additional parameters associated with the link layer network type or particular link layer network specified in the URL (e.g. as inserted in block 124). For example, where the resolving device comprises multiple SIM (Subscriber Identity Module) cards, the URL may further comprise details of which SIM card to use to connect to the identified link layer network. As described above, the URL may also comprise details of the particular APN to use such that, for example, devices with appropriate credentials can connect to one APN (which may provide more bandwidth/less congestion) and those without connect to a different APN.

Where the URL further comprises the address of a particular piece of content (e.g. as inserted in block 126), the URL may additionally comprise metadata relating to the content itself (e.g. the size of the content, an age rating associated with the content, etc) and this metadata (as inserted in block 127) may be used by the resolving device in determining which particular link layer network (from those available or those specified in the URL) to connect to or whether to download the content or not. For example, where the URL includes metadata containing an age rating, this may be evaluated by the resolving device (e.g. in a browser) to determine whether to download the content or not (e.g. based on parental restrictions).

In examples where the URL does not comprise any explicit information about where to access the content on the network, the resolving device may land at a default piece of content (e.g. a default web page) for the particular link layer network, e.g. an AP's default web page. The default location may be implicit or explicit or captive portal-based redirection may be used. Where DHCP (Dynamic Host Configuration Protocol) is used, the default page may be determined based on the IP address allocated to the resolving device by the DHCP server following connection via the particular link layer network. For example, if the resolving device is allocated an IP address 192.168.0.2, it may automatically infer that the default landing page is http://192.168.0.1/. In other examples, the default may be the gateway address, the first address (0.0.0.1) of the subnet (determined by the IP address allocated and the netmask) or another prearranged to specified default subnet location other than 0.0.0.1. In an example, with the IP address 10.20.30.40 and the netmask 255.255.0.0, the "default" address might be 10.20.0.1 (specifically—the IP address is Boolean bitwise ANDed with the netmask then Boolean bitwise ORd with 0.0.0.1).

In various examples, the URL may comprise additional information such as a transcoding proxy to be used (e.g. as inserted in block 125). For example, the URL may comprise a script which details that if a resolving device has a first screen size, it should connect (via the specified link layer network) to the default landing page and if the resolving device has a different screen size, it should connect via a particular transcoding proxy (again via the specified link layer network). Alternatively, the URL may point to different content for different screen sizes. In these examples, the same URL may be shared (e.g. in block 104) with different devices (e.g. devices of different form factor and/or having different screen sizes) and at runtime the resolving device can use the information contained within the URL to determine how to access the content.

Figure 3:
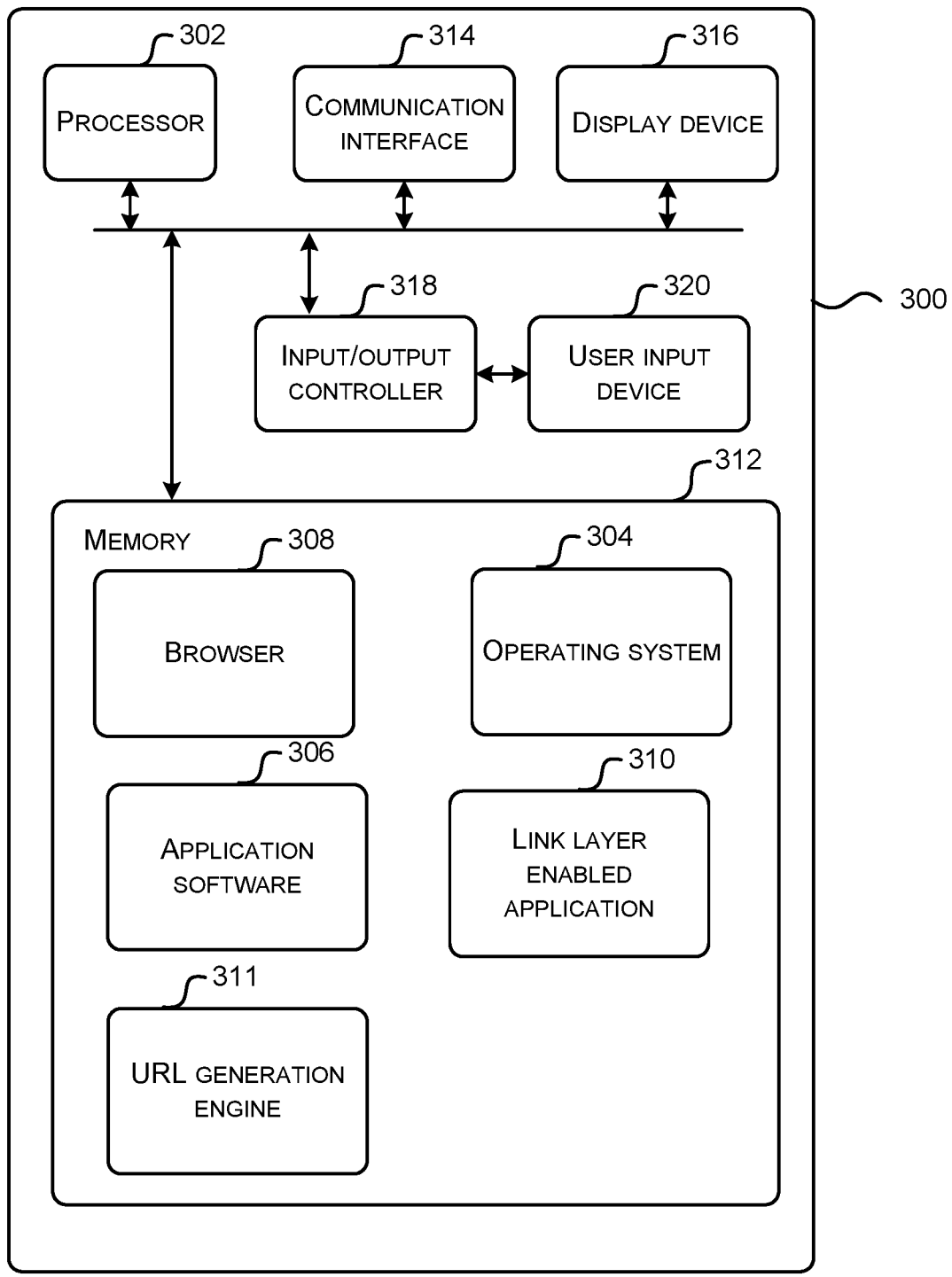
FIG. 3 illustrates an exemplary computing-based device in which embodiments of the methods described herein may be implemented.

FIG. 3 illustrates various components of an exemplary computing-based device 300 which may be implemented as any form of a computing and/or electronic device, and in which embodiments of the methods described herein may be implemented. In particular, this computing-based device 300 may be a generating and/or resolving device.

Computing-based device 300 comprises one or more processors 302 which may be microprocessors, controllers or any other suitable type of processors for processing computer executable instructions to control the operation of the device in order to generate and/or resolve a URL which comprises link layer information as described herein. In some examples, for example where a system on a chip architecture is used, the processors 302 may include one or more fixed function blocks (also referred to as accelerators) which implement a part of the method of generating/resolving a URL in hardware (rather than software or firmware). Platform software comprising an operating system 304 or any other suitable platform software may be provided at the computing-based device to enable application software 306-311 to be executed on the device. The application software may include a browser 308 and/or a link layer enabled application 310 which are arranged to resolve a URL and/or may include a URL generation module 311 arranged to generate a URL comprising link layer information (as described above). The sharing of the URL (where the computing-based device 300 is a generating device) may be performed by the URL generation module 311 or by other application software 306 (e.g. an email, IM, social networking, display application).

Although FIG. 3 shows the URL generation module 311 as comprising computer executable instructions which are executed by the processor 302, alternatively, or in addition, the functionality of the URL generation module may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions may be provided using any computer-readable media that is accessible by computing based device 300. Computer-readable media may include, for example, computer storage media such as memory 312 and communications media. Computer storage media, such as memory 312, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 312) is shown within the computing-based device 300 it will be appreciated that the storage may be distributed or located remotely and accessed via a network or other communication link (e.g. using communication interface 314).

Where the computing-based device 300 is arranged to resolve URLs containing link layer information (as described herein), the communication interface 314 is arranged to connect to a link layer network which is selected by the computing-based device 300 when the URL is resolved (e.g. by the browser 308 or link layer enabled application 310). Where the computing-based device 300 is arranged to generate the URLs containing link layer information, the communication interface 314 may be used to share the URL with other devices or alternatively, other means may be used to share the URL, for example by displaying it (e.g. in the form of a visual code) on a display device 316. It will be appreciated that the communication interface 314 may be arranged to communicate using more than one network protocol (e.g. two or more of WiFi™, wired Ethernet and cellular) or there may be multiple communication interfaces within the computing based device 300.

The computing-based device 300 may comprise a display device 316 which is integral to the computing-based device 300 or alternatively the display device 316 may be external to the computing-based device 300 and the computing-based device may comprise an input/output controller 318 which provides display information to the external display device. The display device 316 may provide a graphical user interface and may, for example, be used to display the URL in some way (e.g. in the form of a visual code) in order to share it with another device. The input/output controller 318 may also be arranged to receive and process input from one or more devices, such as a user input device 320 (e.g. a mouse, keyboard, camera, microphone or other sensor) which again may be integral to or separate from the computing-based device 300. Where the user input device 320 is a camera, this may be used in a resolving device to capture a visual code displayed on another device. In some examples the user input device 320 may detect voice input, user gestures or other user actions and may provide a natural user interface (NUI). This user input may be used to trigger the resolving/generating of the URL containing link layer information. In an embodiment the display device 316 may also act as the user input device 320 if it is a touch sensitive display device. The input/output controller 318 may also output data to devices other than the display device, e.g. a locally connected printing device (not shown in FIG. 3) for printing adhesive labels displaying the URL in some form (e.g. as a visual code).

Any of the input/output controller 318, display device 316 and user input device 320 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 4:
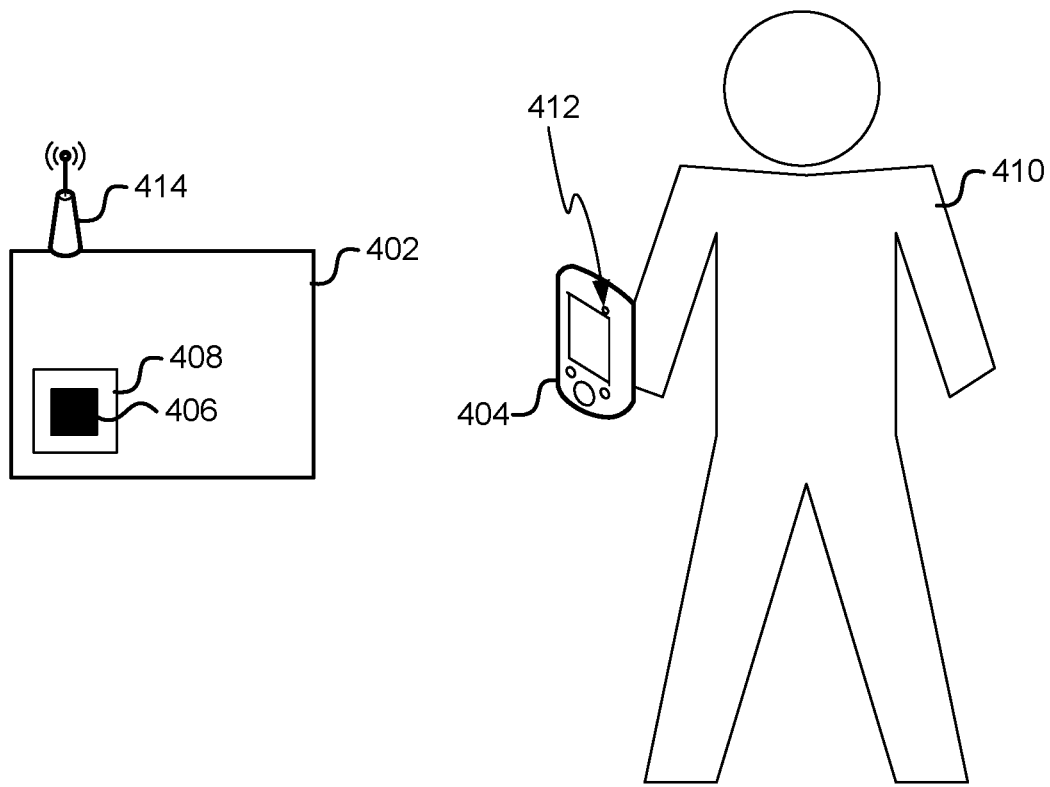
FIG. 4 shows a schematic diagram of a first use example of a URL comprising link layer network information.

FIG. 4 shows a schematic diagram of a first use example. In this example, an appliance 402, such as a coffee machine, is arranged to generate a URL comprising link layer information which enables a resolving device to identify a particular link layer network to connect to. This generated URL is then shared with a nearby device 404, such as a smartphone or tablet, by displaying a visual code 406 (which encodes the URL) on a small display 408. The visual code 406 may be displayed whenever the appliance 402 is operational (e.g. switched on and able to dispense coffee) or may be displayed in response to detection of a nearby device/user or when a user presses a button on the appliance (where this button may be a soft control displayed on the display 408). In other examples, the visual code may be permanently displayed (e.g. on a label stuck to the appliance instead of on the display 408).

When a user 410 wants to operate the appliance (e.g. to get a coffee) they use a camera 412 on a device 404 (e.g. a camera on their smartphone) to capture the visual code 406. The device 404 then decodes the visual code to obtain the URL and resolves the URL. In resolving the URL, the device 404 identifies the link layer information contained within the URL and in this example a single link layer network type, name pair may be included within the URL which identifies an AP 414. The AP 414 may be integral to the appliance 402 or may be close to the appliance 402 such that a device 404 held by a user 410 standing beside the appliance 402 will be in range of the AP 414.

In this example, the URL may also comprise credentials for use in connecting to the AP 414 and these credentials may be static or single use. Where single use credentials are used, once any user has used a particular credential to access the appliance, the appliance may generate a new URL comprising different credentials. Alternatively, the URL may be generated and displayed in response to user input on the appliance and each time a URL is generated, the URL may comprise new credentials.

Having resolved the URL to obtain the link layer network type and name (and credentials where these are provided), the device 404 connects to the AP 414 and the browser or other link layer enabled application running on the device 404 is directed to a default web page associated with the appliance 402. This web page provides a graphical user interface (GUI) for the appliance 402 on the user's device 404 and enables the user to operate the appliance. In this example, the user 410 may use the GUI to select the coffee they require (e.g. cappuccino/latte/expresso). The user may be prompted to enter payment information or in some examples, credentials stored within the link layer enabled application running on the device 404 may be used to link to account details for the user 410 to enable payment for the coffee.

Using a similar method, a service engineer may be able to access a different default web page (e.g. by capturing the same visual code or a different visual code) in order to access service parameters associated with the appliance 402. In some examples, the appliance may display a number of different visual codes which each direct a resolving device to a different web page, e.g. one for making a drink, another for regular maintenance or device configuration and another for servicing.

In examples where the URL generated each time is different, the URL may act as a unique identifier for the recipient. So, if the recipient uses the same URL on a subsequent day (e.g. without first requesting a new URL), the machine will be able to offer them a customized experience (e.g. remembering their previous coffee choice) without relying on the user's browser to store a cookie. Also, by bookmarking the coffee machine URL, the user may be able to use any device to access the coffee machine (e.g. their smartphone or their tablet) and automatically get a customized UI and/or experience.

In various examples, the URLs could act as a queueing machine for the coffee machine or other appliances with a wait time (e.g. a fairground ride). In such an implementation, the user has to be physically present to see and visit the URL and thereby obtain a credential verifying they have that location in the queue for the appliance. They could then use the UI of the machine to configure what they want to do (e.g. select their coffee choice) knowing that they have already reserved a position in the queue for dispensing the coffee.

In an alternative implementation, the appliance 402 generates a URL specifying a link layer network type and name and credentials and displays a visual code 406 which encodes the URL. On decoding the visual code and resolving the URL, the user's device 404 is triggered to set up an AP with the name specified in the URL and access credentials as specified in the URL. Once the AP is set up by the resolving device, the appliance 402 is able to connect to the device 404 using the credentials that it supplied to the device in the URL.

Figure 5:
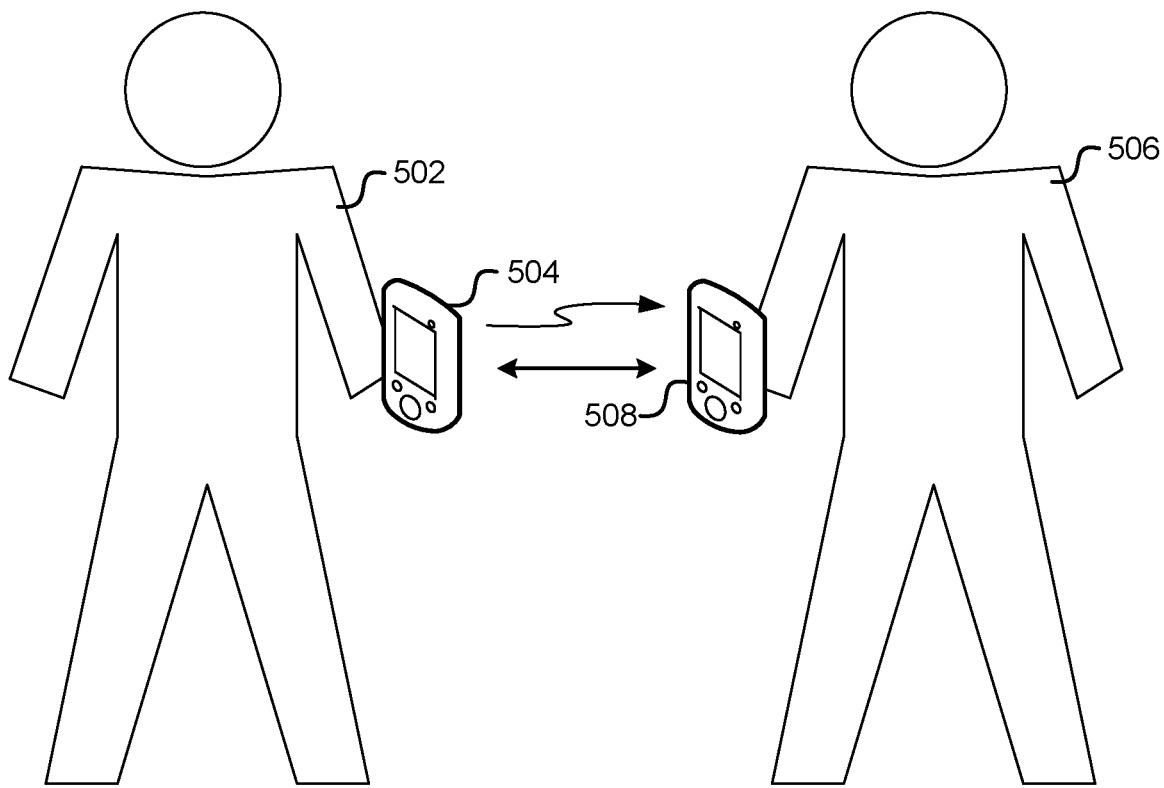
FIG. 5 shows a schematic diagram of a second use example of a URL comprising link layer network information.

FIG. 5 shows a schematic diagram of a second use example. In this example, a user 502 wishes to share a file stored on their handheld computing device 504 (which may be a smartphone or tablet) with another user 506. The user 502 triggers the generation of a URL by their device 504 and this URL may then be shared with the other user's device 508 using a short-range wireless communication protocol (e.g. NFC, IR or Bluetooth™). The user's trigger may also cause their device 504 to set up an AP within the device and credentials associated with this AP (e.g. the security key) are included within the URL which is shared. The receiving device 508 resolves the URL, identifies the link layer network information which comprises the network type (e.g. the AP type, which may be WiFi™), the BSSID and the credentials to be used when connecting to the AP. The URL also comprises the address of the particular piece of content that the first user 502 wishes to share. Using the information contained within the URL, the receiving device 508 connects to the AP in the first device 504 and downloads the particular piece of content. As the URL and credentials are specific to the particular piece of content, the second user 506 (via their device 508) does not gain access to any other content stored on the first user's device 504. Furthermore, if the AP credentials are single use, when the two users 502, 506 are close together at a later time (e.g. on another day), the credentials will no longer be valid and so the second user 506 will not still have access to the particular piece of content (e.g. if the second user 506 has stored the received URL). This increases the security of the data stored on the first user's device 504.

In examples described above, the URL which is generated comprises link layer information which is used by a resolving device to determine how to access a piece of content, where this piece of content may be specifically identified within the URL or may be a default piece of content (e.g. landing page) which in turn relates to the particular link layer network used. The URL may further comprise properties of the piece of content (e.g. in the form of metadata). As described above, in some examples, the destination may be contingent on the properties of the resolving device. By including this information within the URL it can be used by the resolving device at runtime and decisions/selections can be made based on the particular circumstances existing at runtime. Furthermore, by including options within the URL which can be interpreted based on characteristics of the resolving device, it is not necessary to generate different URLs for different device types (which may be complex, particularly to ensure that the correct URL is shared with the correct device).

In addition to (or instead of) including the link layer information in the URL, other communication path information such as a DNS server to use in looking up the host, may be included within the URL. In other examples, the communication path information may comprise any type of information which is used to modify the default resolution/routing of the URL so that it goes elsewhere—at the link layer (i.e. the lower layer of the stack) or at the IP layer or at the HTTP layer (e.g. "use this HTTP proxy if using this AP").

The methods described herein may make it easy to dynamically and automatically switch between link layer networks based on conditions at runtime. The possible link layer networks are specified in the URL and the resolving device can select a particular link layer network automatically at runtime from the set of possible link layer networks. As described above, the set of possible link layer networks may comprise link layer networks which are all of the same type or which are of different types. Depending on the selection criteria used by the resolving device (and which may be specified within the URL), the methods may provide a user with monetary savings (e.g. by only allowing a large file to be downloaded over a free or low cost link layer network).

Although in the examples described above, the selection of a link layer network (where selection is required) is performed at runtime, it will be appreciated that in some examples, the selection of a link layer network (e.g. from a list of link layer network names included within the URL) may be performed in advance of runtime.

The examples described above use a visual code as an example way of encoding a URL for display. It will be appreciated that a visual code provides one example method and other codes may alternatively be used or the URL may be displayed in the form of a text string. In another example, the URL code may be encoded in an audio clip which may be played by the generating device, captured by the resolving device (e.g. using a microphone) and decoded using software running on the resolving device (or elsewhere).

The methods described herein may increase the speed of accessing content by providing more direct links to the source of the content (e.g. so that a device does not have to go via another AP) and/or specifying a minimum QoS for a link layer network. In some cases, connecting to the correct link layer network may enable access to content which cannot be accessed by connecting to any other link layer network.

As URLs may be bookmarked by the browser (or other application) on the resolving device they may provide a long-lived way of accessing one device's resources (e.g. media stored on a home server or desktop computer in the home) from another device (e.g. a smartphone or tablet when in the home).

The methods described herein improve usability because they do not require any user input to select the correct link layer network which might otherwise be required in order that content can be accessed. As direct connections can be established through use of the URLs described herein (e.g. between the appliance and the device in the example shown in FIG. 4), there is less (or no) reliance on the infrastructure. Additionally, as direct connections can be established through the methods described herein, it is possible to have "friendlier" names for content, e.g. in the form of local top level domains, within the URL. Use of friendlier names (e.g. which are human readable and easy for a user to read out or type in) may mean that the sharing of the URL may be implemented by displaying the URL (e.g. in text format, rather than as a visual code as in the examples described previously) which may then be entered (e.g. typed) by a user into the resolving device. For example, referring back to FIG. 4, the appliance 402 may display the URL as "{wifi:coffee}" which may be inferred (by the resolving device) as:

http://{wifi:coffee}/ where 'wifi' is the link layer network type and 'coffee' is the SSID of the AP of the appliance. In other examples, this may be displayed as just {coffee} where both WiFi™ and http are considered implicit for devices which primarily use WiFi™ as their access network.

The methods described herein may increase the security of data which is being shared or which is being stored in the same location (e.g. in the same data store) as data which is being shared. As described above, a URL may comprise credentials which relate to a single piece of content and/or which are single use. Furthermore, by use of sharing mechanism (for the URL) which requires proximity, it is easier to ensure that the correct user is given the URL (and any access credentials it contains) and to limit or eliminate any possibility of interception by a third party. For example, use of a BSSID (rather than a WiFi™ SSID) will limit access to the content to devices which are in range of a single AP (with the defined BSSID) and provides proximity-based security. A user may, for example, only be able to access an admin console of a printer if they are connected to an AP beside the printer (and so must be close by), even if that AP is part of a larger network comprising many APs which all share the same SSID.

Any credentials which are shared in a URL may be independent of any existing credentials on a user's device. This may remove any requirement for a user to complete log-in screens and hence shorten the overall interaction time and simplify the operation for the user. This may be particularly useful for long and/or complicated credentials such as security keys for wireless AP which may be long strings of characters.

In implementations where multiple link layer networks are available, use of criteria within the URL to determine which link layer network is selected by the resolving device (e.g. whether credentials are available to the user) may speed up connection time, since association and authentication can be slow, by stopping the resolving device from trying multiple networks, particularly where it can be determined in advance that the authentication is not likely to succeed.

As the URL may be resolved by a browser, the methods described herein may be cross-platform (e.g. independent of the underlying hardware or operating system used on a device) and may also be backwards compatible (e.g. such that a browser that cannot resolve and interpret the link layer network information contained with the URL just ignores it and proceeds as if it were not included in the URL). The URLs described herein are also compatible with existing systems for storing, sharing and transmitting URLS, such as "favorites" folders.

Although the present examples are described and illustrated herein as being implemented in a wireless system, the system described is provided as an example and not a limitation. As those skilled in the art will appreciate, the present examples are suitable for application in a variety of different types of communication systems and the methods may also be applied to wired link layer network protocols. In such examples, the link layer network name may correspond to a VLAN name (e.g. where there is a corporate VLAN and a second isolated VLAN for devices without the credentials to log on to the corporate VLAN).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
receiving, at a resolving device, a URL specifying, within metadata of the URL, a location for content, at least two networks comprising a first network name corresponding to a first network and a second network name corresponding to a second network, credentials for accessing each of the at least two networks, and criteria for selecting between the first network and second network based on a location of the resolving device;
determining the resolving device is at a first location that the criteria directs to use the first network; and
directing the resolving device to access the content by connecting to the first network, based on said determination that the resolving device is at the first location, using the credentials specific to the first network.

2. The method of claim 1, wherein the metadata comprises at least one parameter for accessing the first network.

3. The method of claim 1, wherein the URL wherein the first network comprises a WiFi access point.

4. The method of claim 3, wherein the URL is transmitted by way of at least one of: e-mail, instant messaging, social networking, Bluetooth, near-field communication, infra-red, visual code, or a visual code that is readable by the resolving device.

5. The method of claim 4, wherein the URL comprises an identifier of the first network name.

6. The method of claim 1, wherein the URL or the metadata further comprises selection criteria for use by the resolving device in selecting a link layer network name from the first network and the second network specific in the metadata.

7. The method of claim 1, wherein the first network name comprises an unsecured network name designating an unsecured network.

8. The method of claim 7, further comprising directing the resolving device to use the URL to access the content using the first network based on the location of the resolving device.

9. The method of claim 1, wherein the one or more credentials comprise a one-time key for the first network.

10. The method of claim 7, further comprising directing the resolving device to use the URL to access the content using the first network based on a time of day additionally specified in the URL.

11. A resolving device, comprising:
one or more processors; and
memory arranged to store computer executable instructions that, when executed, cause the processor to:
receive a URL and metadata of the URL, the metadata specifying a location for content, a secured network name corresponding to a secured network, an unsecured network name corresponding to an unsecured network credentials for accessing each of the secured network and the unsecured network, and criteria for selecting between the secured network and the unsecured network based on a location of the resolving device; and
direct the resolving device to access the content using either, based on the location of the resolving device, the secured network or the unsecured network specified in the metadata.

12. The resolving device of claim 11, wherein the memory is further arranged to store computer executable instructions, which when executed cause the one or more processors to share the URL with a second resolving device.

13. The resolving device of claim 11, further comprising:
a display device and wherein sharing the URL with the second resolving device comprises:
generating a visual code that encodes the URL, and displaying the visual code on the display device.

14. The resolving device of claim 11, further comprising a communication interface and wherein sharing the URL with a second resolving device comprises:
transmitting the URL to the second device via the communication interface.

15. The resolving device of claim 11, wherein the metadata of the URL further includes an age rating associated with the content that is usable by the resolving device determine whether to download the content.

16. The resolving device of claim 11, wherein the location is determined to be a home location associated with a user of the resolving device.

17. The resolving device of claim 16, wherein the credentials are specific to both the secured network and the piece of content.

18. The resolving device of claim 11, wherein the metadata further comprises one or more additional rules for the resolving device to connect to either the secured network or the unsecured network, the one or more additional rules comprising at least one member of a group comprising: time of day, quality of service, characteristics of the content, or the credentials for connecting to either the secured network or the unsecured network.

19. One or more computer memory embodied with computer-executable instructions configured to cause a resolving device to access content specified in a URL using particular networks, comprising:
receiving, at the resolving device, the URL and metadata associated with the URL, the metadata specifying a location for content, at least two networks comprising a first network name corresponding to a secured network and a second network name corresponding to a second network, credentials for accessing the at least two networks, and criteria for selecting between the first network and second network based on a location of the resolving device;
determining the resolving device is at a first location that the criteria directs to use the first network; and
directing the resolving device to access the content by connecting to the first network, base on said determination that the resolving device is at the first location, using the credentials specific to the first network.

20. The computer memory of claim 19, wherein the metadata further comprises one or more additional rules for the resolving device to connect to either the first network or the second network, the one or more additional rules comprising at least one member of a group comprising: time of day, quality of service, characteristics of the content, or credentials for connecting to either the secured network or the unsecured network.

* * * * *